(12) United States Patent
Yoon et al.

(10) Patent No.: US 9,645,730 B2
(45) Date of Patent: May 9, 2017

(54) METHOD AND APPARATUS FOR PROVIDING USER INTERFACE IN PORTABLE TERMINAL

(71) Applicant: SAMSUNG ELECTRONICS CO., LTD., Suwon-si (KR)

(72) Inventors: Jin Yoon, Seoul (KR); Youngjoo Park, Yongin-si (KR); Sungjae Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 115 days.

(21) Appl. No.: 14/187,816

(22) Filed: Feb. 24, 2014

(65) Prior Publication Data
US 2014/0245202 A1 Aug. 28, 2014

(30) Foreign Application Priority Data
Feb. 22, 2013 (KR) .................. 10-2013-0019505

(51) Int. Cl.
*G06F 3/048* (2013.01)
*G06F 3/0488* (2013.01)
*G06F 3/0482* (2013.01)
*G06F 3/0481* (2013.01)
*G06F 9/44* (2006.01)

(52) U.S. Cl.
CPC .......... *G06F 3/0488* (2013.01); *G06F 3/0481* (2013.01); *G06F 3/0482* (2013.01); *G06F 3/04883* (2013.01); *G06F 9/4443* (2013.01)

(58) Field of Classification Search
CPC .................................................. G06F 3/0488
See application file for complete search history.

(56) References Cited

U.S. PATENT DOCUMENTS

| | | | |
|---|---|---|---|
| 8,630,623 B2 * | 1/2014 | Park ...................... | G06F 3/0488 345/173 |
| 8,831,567 B2 * | 9/2014 | Kim .................... | G06F 21/6218 455/411 |
| 9,008,619 B2 * | 4/2015 | Lee ......................... | H04M 1/67 380/247 |
| 9,009,630 B2 * | 4/2015 | Kruzeniski ......... | G06F 21/6209 715/817 |

(Continued)

FOREIGN PATENT DOCUMENTS

| KR | 10-2010-0134884 A | 12/2010 |
|---|---|---|
| KR | 10-2012-0055107 A | 5/2012 |

OTHER PUBLICATIONS

Communication dated Jun. 1, 2016, issued by the Korean Intellectual Property Office in corresponding Korean Application No. 10-2013-0019505.

*Primary Examiner* — Omar Abdul-Ali
(74) *Attorney, Agent, or Firm* — Sughrue Mion, PLLC

(57) ABSTRACT

Disclosed are a method and an apparatus for providing a user interface of a portable terminal. The method includes displaying a lock screen; detecting a request to display an auxiliary including a plurality of modes on the lock screen; and displaying the auxiliary window in a specific mode among the plurality of modes on a side of the lock screen in response to the detecting indicating that the request for the display of the auxiliary window is detected, wherein the specific mode is changed in response to a mode changing event.

6 Claims, 13 Drawing Sheets

(56) References Cited

U.S. PATENT DOCUMENTS

| | | | | |
|---|---|---|---|---|
| 2009/0249247 A1* | 10/2009 | Tseng | ............... | H04M 1/72552 |
| | | | | 715/808 |
| 2010/0235732 A1* | 9/2010 | Bergman | .............. | G06F 3/0488 |
| | | | | 715/702 |
| 2012/0046079 A1* | 2/2012 | Kim | ................. | H04M 1/72577 |
| | | | | 455/566 |
| 2012/0084691 A1* | 4/2012 | Yun | ................... | H04M 1/72519 |
| | | | | 715/769 |
| 2012/0084734 A1* | 4/2012 | Wilairat | ................. | G06F 21/36 |
| | | | | 715/863 |
| 2012/0127105 A1 | 5/2012 | Kim | | |
| 2012/0233571 A1* | 9/2012 | Wever | .................... | G06F 3/048 |
| | | | | 715/835 |
| 2012/0284673 A1* | 11/2012 | Lamb | ................ | G06F 3/04883 |
| | | | | 715/863 |
| 2013/0191911 A1* | 7/2013 | Dellinger | ................ | G06F 21/36 |
| | | | | 726/19 |

* cited by examiner

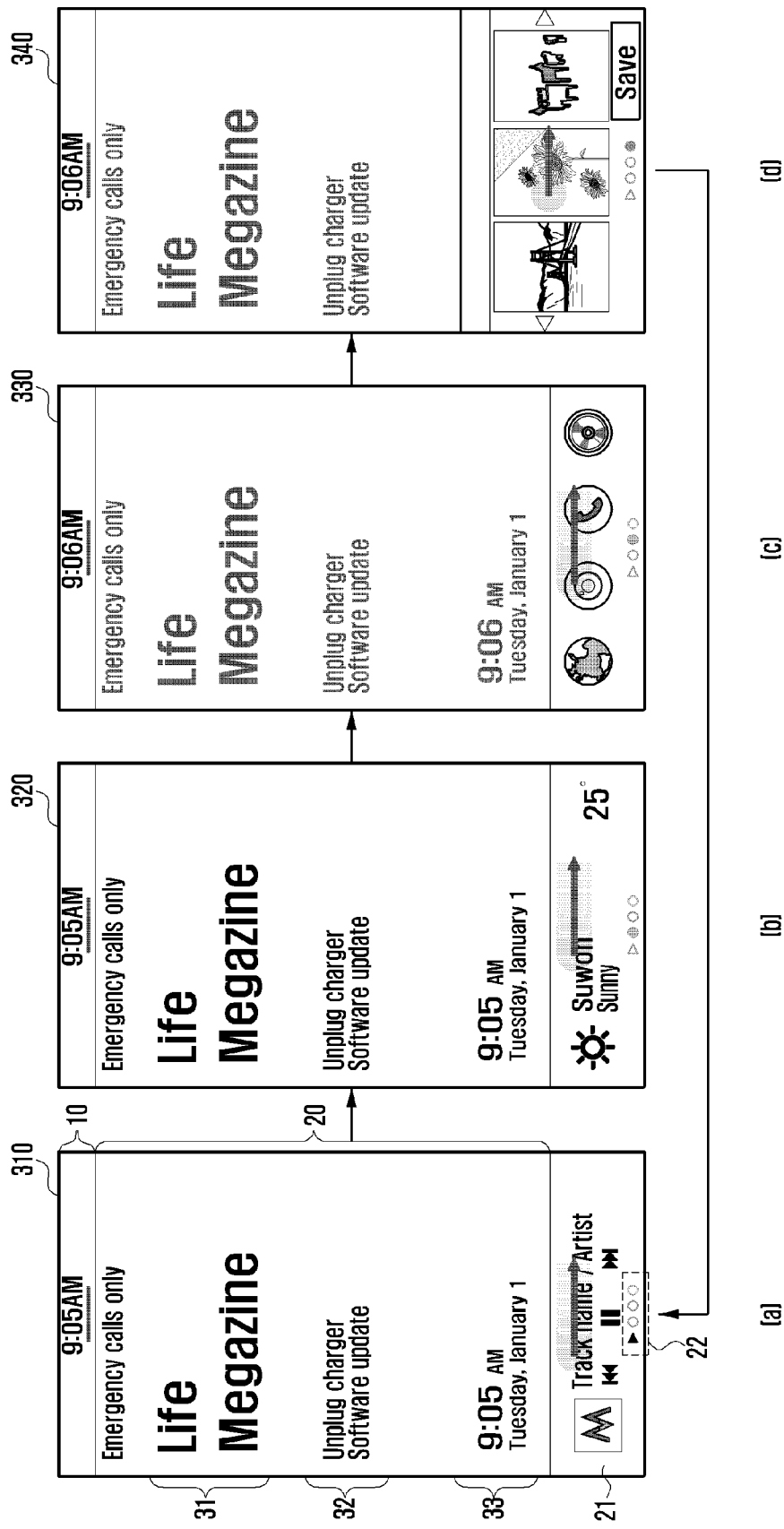

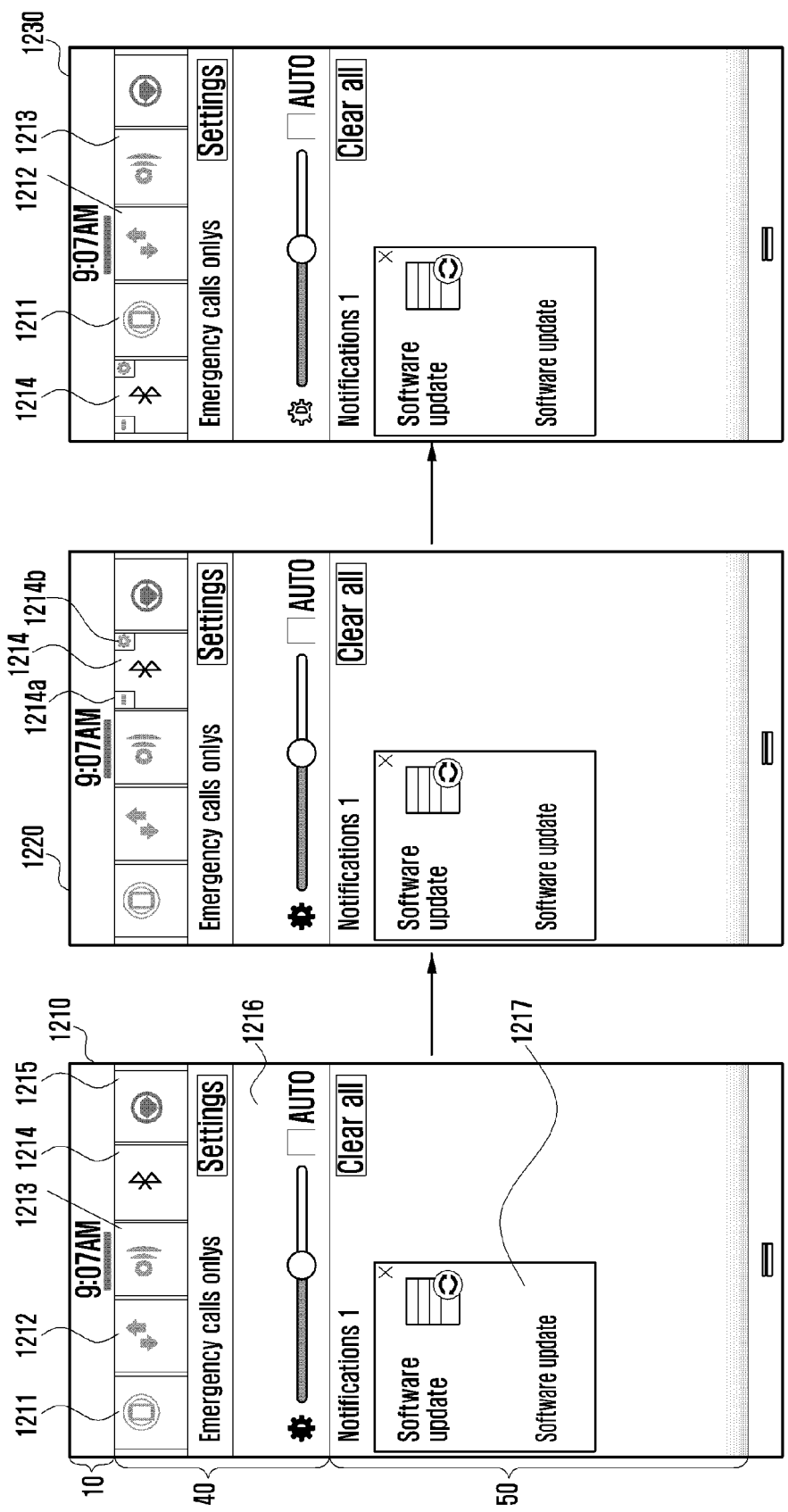

METHOD AND APPARATUS FOR PROVIDING USER INTERFACE IN PORTABLE TERMINAL

CROSS-REFERENCE TO RELATED APPLICATION

This application claims the priority under 35 U.S.C. §119(a) to Korean Patent Application Serial No. 10-2013-0019505, which was filed in the Korean Intellectual Property Office on Feb. 22, 2013, the entire content of which is hereby incorporated by reference in its entirety.

BACKGROUND

1. Field

The exemplary embodiments relate to a method and an apparatus for providing a user interface, and more particularly to a method and an apparatus for providing a user interface of a portable terminal, which are capable of improving user's convenience.

2. Description of the Related Art

Recently, with remarkable developments in information technology, communication technology and semiconductor technology, the use of portable terminals has rapidly increased. Thus, the portable terminal has become a necessity for modern human beings, and has provided various functions which are useful for users. For example, the portable terminal provides various functions such as a voice call function, an image or video photographing function, a broadcasting receiving function, and an Internet accessing function. As described above, since the portable terminal may provide various functions, interest in a User Interface (UI) capable of promptly and conveniently controlling the portable terminal has been increasing.

Further, a conventional portable terminal provides limited functions such as a deletion function, a movement function, an addition function and the like of icons through a UI in a fixed form on a home screen. That is, the conventional portable terminal results in inconvenience in that a user cannot change a configuration of the UI into a preferred configuration, or must change the configuration of the UI through a complicated procedure.

SUMMARY

The exemplary embodiments have been made to solve the above-mentioned problems in the conventional art, and an aspect of the exemplary embodiments is to provide a method and an apparatus for providing a User Interface (UI) of a portable terminal, which are capable of improving a user's convenience.

Another aspect of the exemplary embodiments is to provide a method and an apparatus for providing a User Interface (UI) of a portable terminal, in which the UI can be easily changed.

In accordance with an aspect of an exemplary embodiment, there is provided a method of providing a User Interface (UI) of a portable terminal, the method including: displaying a lock screen; detecting a request to display an auxiliary window including a plurality of modes on the lock screen; and displaying the auxiliary window in a specific mode among the plurality of modes on a side of the lock screen in response to the detecting indicating that the request for the display of the auxiliary window is detected, wherein the specific mode is changed in response to a mode changing event.

In accordance with another aspect of an exemplary embodiment, there is provided an apparatus configured to provide a User Interface (UI) of a portable terminal, the apparatus including: a controller configured to control a display to display an auxiliary window in a specific mode among a plurality of modes on a side of a lock screen displayed by the display in response to detecting a request to display the auxiliary window including the plurality of modes on the lock screen, and to change the specific mode in response to a mode changing event.

In accordance with another aspect of an exemplary embodiment, there is provided a portable terminal, the portable terminal including: a storage configured to store content; and a controller configured to control a display of the portable terminal to display: a lock screen which locks the display and thereby prevents a user from accessing the content; and an auxiliary window which enables a user to access the content when the lock screen is displayed.

As described above, the method and apparatus for providing the User Interface of the portable terminal according to the exemplary embodiments can enable the user to construct the UI according to the preferences of the user, thereby improving the user's convenience. Further, the exemplary embodiments can help the user to easily change the UI.

BRIEF DESCRIPTION OF THE DRAWINGS

The above and other aspects, features, and advantages of the exemplary embodiments will be more apparent from the following detailed description taken in conjunction with the accompanying drawings, in which:

FIGS. 3, 4A, 4B, 5, 6 and 7 are exemplary views illustrating the lock screens on which the UI is provided according to an exemplary embodiment;

FIG. 12 is an exemplary view illustrating the quick panel on which the UI is provided according to an exemplary embodiment.

DETAILED DESCRIPTION OF THE EXEMPLARY EMBODIMENTS

Figure 1:
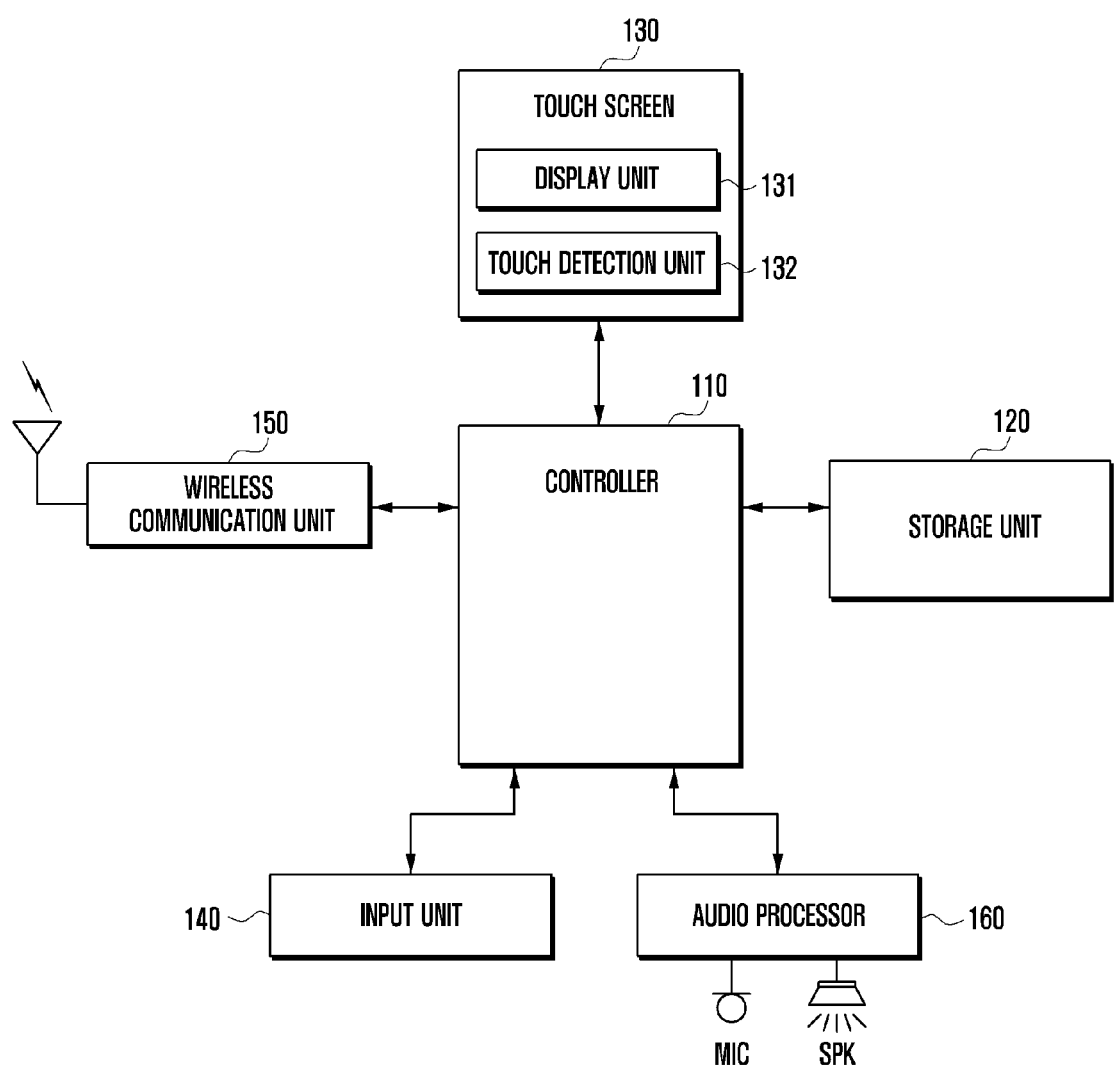
FIG. 1 is a block diagram illustrating a configuration of a portable terminal according to an exemplary embodiment.

Hereinafter, exemplary embodiments will be described with reference to the accompanying drawings. It should be noted that the same elements will be designated by the same reference numerals although they are shown in different drawings. Further, detailed descriptions related to well-known functions or configurations capable of making the subject matter of the exemplary embodiments unnecessarily obscure will be omitted.

According to exemplary embodiments, a portable terminal may include a mobile communication terminal, a smart phone, a table Personal Computer (PC), a hand-held PC, a Portable Multimedia Player (PMP), a Personal Digital Assistant (PDA), a laptop computer, and the like.

FIG. 1 is a block diagram illustrating a configuration of a portable terminal according to an exemplary embodiment.

Referring to FIG. 1, the portable terminal 100 according to an exemplary embodiment includes a controller 110, a storage unit 120, a touch screen 130, an input unit 140, a wireless communication unit 150, and an audio processor 160. The touch screen 130 includes a display unit 131 and a touch detection unit 132.

The portable terminal 100 having the configuration according to an exemplary embodiment may provide a User Interface (UI) capable of improving user convenience by using a status bar, a home screen, a lock screen, a quick panel and the like, and may support a function capable of personalizing the UI. Hereinafter, the configuration of the portable terminal 100 supporting the above-mentioned functions will be described.

The audio processor 160 may be connected to a speaker (SPK) for outputting an audio signal transmitted and received during a voice call, an audio signal included in a received message, an audio signal in a reproduction of an audio file stored in the storage unit 120, and the like, and a microphone (MIC) for receiving a user's voice data or other audio signals. The audio processor 160 may output a sound effect informing the user of an occurrence of a touch event input in a home screen, a lock screen, a quick panel and the like, a sound effect for indicating a reception of a Short Message Service (SMS) message, a sound effect for indicating an update of software, and the like through the speaker, under a control of the controller 110.

The wireless communication unit 150 may include a wireless communication module for supporting a wireless communication function such as the wireless Internet, e.g., WiFi, WiBro, WiMax and the like, and a short range wireless communication, e.g., Bluetooth communication, Near Field Communication (NFC) and the like, and/or a mobile communication module for supporting a mobile communication function, e.g., third generation or fourth generation mobile communication. The wireless communication unit 150 may include a Radio Frequency (RF) transmission unit (not shown) for up-converting and amplifying a frequency of a transmitted signal, and an RF reception unit (not shown) for low-noise amplifying and down-converting a received signal. The wireless communication unit 150 according to the exemplary embodiments may receive weather information and news from a weather information supplying server and a news supplying server if a weather widget, a news widget and the like are displayed on a screen, e.g., a home screen, a lock screen and the like, of the display unit 131.

The input unit 140 may include various input keys and function keys for inputting of numerals or character information and setting of various functions. The function keys may include a direction key, a side key, and a shortcut key for execution of specific functions. Further, the input unit 140 generates a key signal related to a user setting and a function control of the portable terminal 100 and transfers the generated key signal to the controller 110. The input unit 140 may be configured by any one or a combination of input devices, such as a QWERTY keypad, a 3*4 keypad, a 4*3 keypad, a ball joystick, an optical joystick, a wheel key, a touch key, a touch pad, a touch screen, and the like. Alternatively, the input unit 140 may include only certain keys such as a volume control key, an electric power supply key, a menu key, a cancel key, a home key and the like if the portable terminal 100 supports a full touch screen. Especially, the input unit 140 according to an exemplary embodiment may generate various input signals for controlling the portable terminal 100 through the UI by using the lock screen, the home screen, the status bar, the quick panel and the like, e.g., an input signal for turning on/off an auxiliary window, an input signal for changing a mode of the auxiliary window, an input signal for requesting a change of a display mode of the status bar, and an input signal for requesting that an editing mode of the quick panel is turned on/off, and transmit the input signals to the controller 110.

The touch screen 130 may perform an input function and a display function. To perform these functions, the touch screen 130 may include the display unit 131 and the touch detection unit 132.

The display unit 131 displays information input by the user or information to be provided to the user as well as various menus of the portable terminal 100. The display unit 131 may include a Liquid Crystal Display (LCD) unit, an Active Matrix Organic Light Emitted Diode (AMOLED) and the like. The display unit 131 may provide various screens according to use of portable terminal 100, e.g., a home screen, a menu screen, a web page screen, a voice call screen, and the like. Especially, the display unit 131 according to an exemplary embodiment may provide various UI screens by using the home screen, the lock screen, the status bar or the quick panel. The display unit 131 will be described in detail with reference to FIGS. 3, 4, 5, 6, 7, 8, 10 and 12.

The touch detection unit 132 is a device for providing an input function and may generate a touch event and transmit the generated touch event to the controller 110 when a touch input device, such as a user's finger, a stylus pen, or an electronic pen, contacts or approaches the touch detection unit. Specifically, the touch detection unit 132 can recognize the occurrence of a touch event through a change in physical properties, e.g., a capacitance or a resistance value, according to contact or approaching of a touch input device, and transfer the touch event type, e.g., tap, a drag, flick, long touch, double-touch, multi-touch, etc., and touch location information of the occurred touch to the controller 110. Many different types of touch detection units 132 which are known to those skilled in the art may be implemented in accordance with the exemplary embodiments, so a detailed description thereof is omitted here. Particularly, the touch detection unit 132 according to an exemplary embodiment may generate a touch signal for controlling the portable terminal 100 through the UI according to an exemplary embodiment, and transmit the touch signal to the controller 110.

The storage unit 120 may store an Operating System (OS) of the portable terminal 100, and application programs necessary for other optional functions, e.g., an audio reproduction function, an image or video reproduction function, a broadcasting reproduction function, an Internet access function, a Short Message Service (SMS) function and the like. Further, the storage unit 120 may store various types of data, e.g., a video file, a game file, a music file, a movie file and the like. Especially, the storage unit 120 according to an exemplary embodiment may include a layout control module for controlling a layout of the status bar, the quick panel, the home screen and the lock screen to a user's preferences. The storage unit 120 may include layouts of the status bar, the quick panel, the home screen and the lock screen. Further, the storage unit 120 may store status bar display information set by the user. For example, the status bar may display all notification icons including information necessary for notification, which is provided by the portable terminal 100, when the status bar operates in a first display mode, while displaying only a single notification icon including information necessary for notification, among many pieces of the status display information, when the status bar operates in a second display mode. Further, the storage unit 120 may store status bar display information set by the user. Further, the storage unit 120 may store a touch interaction, e.g., a long touch and a pattern, for turning on/off the editing mode of the auxiliary window, the home screen, the quick panel and the like.

The controller 110 may control overall operations of the portable terminal 100 and a signal flow between internal blocks of the portable terminal 100, and may perform a function of processing data. For example, the controller 110 may include a Central Processing Unit (CPU), an application processor, and the like. The controller 110 may include a single core processor or a multi-core processor. The controller 110 may provide the UI by using the status bar, the home screen, the lock screen, the quick panel and the like. The controller 110 will be described with reference to FIGS. 2 to 12 later.

Although not shown in FIG. 1, the portable terminal 100 may selectively include structural elements having additional functions, such as a Global Positioning System (GPS) module for receiving location information, a broadcasting receiving module for receiving broadcasting, a digital sound source module such as an MP3 module, a camera module for an image or video photography, or a video call. While all of the possible structural elements which may be implemented into the portable terminal 100 are not listed since the structural elements may be variously modified according to the convergence trend of digital devices, the portable terminal 100 according to exemplary embodiments may further include many different types of structural elements at the equivalent level to the above listed components, as well as many other different types of structural elements.

Figure 2:
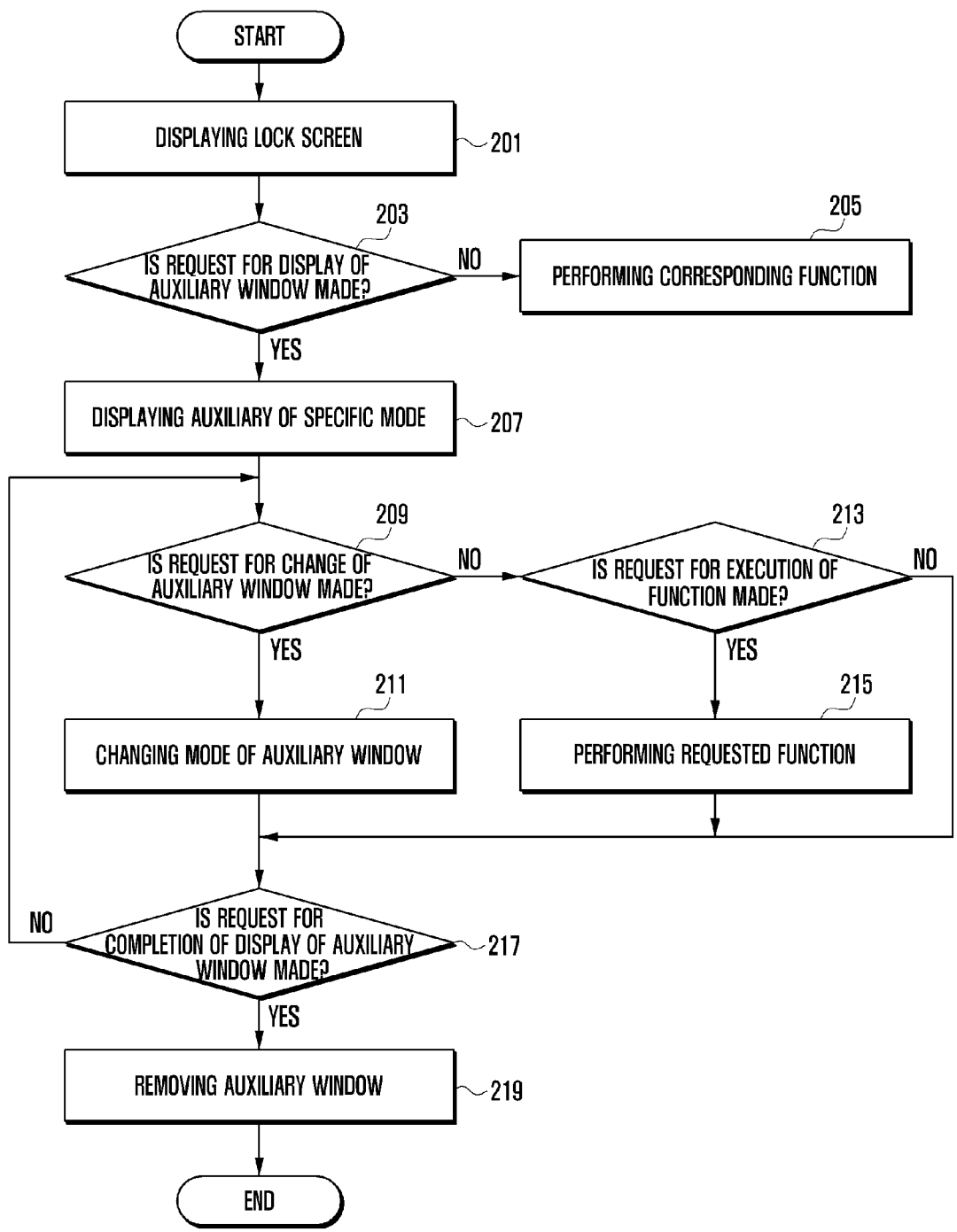
FIG. 2 is a flowchart illustrating a process of providing a User Interface (UI) on a lock screen according to an exemplary embodiment.

FIG. 2 is a flowchart illustrating a process of providing the User Interface (UI) on the lock screen according to an exemplary embodiment, and FIGS. 3 to 7 are exemplary views illustrating the lock screen on which the process of providing the UI is executed according to an exemplary embodiment.

Referring to FIGS. 2 to 7, the controller 110 of the portable terminal 100 according to an exemplary embodiment may control the display unit 131 to display the lock screen in operation 201. The lock screen is displayed when a key input occurs in the state that the display unit 131 is turned off. The lock screen may include a status bar region 10 and a lock image display region 20. The status bar region 10 is a region in which information provided to the user is displayed in icon form. For example, the status bar region 10 may display information such as a remaining amount of battery, intensity of a received signal, a vibration/sound/silence mode, a setting of an alarm and the like. The lock screen display region 20 may display a profile 31 input by the user, an event 32 to be indicated to the user, a clock 33 and the like.

In the state that the lock screen is output, the controller 110 may identify whether a request for a display of the auxiliary window 21 is detected in operation 203. The request for the display of the auxiliary window 21 is made when a preset key, e.g., a home key (not shown), is input. The auxiliary window 21 is a region in which a specific function is performed in the state that the lock status is not released. Thus, the exemplary embodiments can address the inconvenience associated with the conventional art in which a lock status must be released in order to perform a specific function. Especially, the auxiliary window 21 according to an exemplary embodiment may have a plurality of functions. That is, the auxiliary window 21 may have a plurality of modes. Particularly, the auxiliary window 21 may include a mini controller mode, a widget mode, a shortcut icon display mode, a mode for displaying a recently executed application icon, and a mode of setting a background of a lock screen and the like, as shown by the exemplary screens 310, 320, 330 and 340 in (a), (b), (c) and (d) of FIG. 3. The mode of the auxiliary window 21 can be set by the user. A number of circular icons 22 provided in a number corresponding to a number of modes of the auxiliary window 21 are displayed at a lower portion of the auxiliary window 21. The modes of the auxiliary window 21 are mapped to the icons respectively. Also, the auxiliary window 21 may be displayed on a layer which is distinguished from or identical to a layer on which the lock screen is displayed.

If a request of a display of the auxiliary window 21 is not detected in operation 203, the controller 110 may perform a corresponding function in operation 205. For example, the controller 110 may release a lock according to the touch input for releasing the lock which occurs in the lock image displaying region 20. Alternatively, the controller 110 may turn off the lock screen when a preset key, e.g., an electric power supply key, is input.

On the other hand, if the request for the display of the auxiliary window 21 is detected in operation 203, the controller 110 may perform operation 207 so as to display the auxiliary window 21 of a specific mode at a side of the lock screen. The specific mode may be a mode which is set to a default, or a mode which is recently used by the user. For example, as indicated by a reference numeral 310 in (a) of FIG. 3, the controller 110 may display the auxiliary window 21 of a mini controller mode, in which a mini controller is displayed, at a lower portion of the display region 20 in order to control a reproduction of music. Alternatively, the mini controller mode may be always provided, or may be provided only in the case that music is reproduced.

Next, the controller 110 can identify whether a request for a change of a mode of the auxiliary window 21 is detected, in operation 209. In the case that the change of the mode of the auxiliary window 21 is requested in operation 209, the controller 110 may perform operation 211 so as to change the mode of the auxiliary window 21. For example, in the exemplary views of the screens indicated by reference numerals 310 to 340, each time that a transverse directional movement of a touch event moving from left to right is detected, the controller 110 may sequentially change the mode of the auxiliary window 21 into the mini controller mode, the widget mode, the shortcut icon display mode and the lock screen setting mode. Alternatively, the controller 110 may change the mode of the auxiliary window 21 in reverse sequence each time that the transverse directional movement of the touch event moving from right to left is detected. The mode of the auxiliary window 21 may be changed in a toggle manner. That is, in the exemplary view of the screen indicated by the reference numeral 340, if the movement of the touch event moving from left to right is detected in the auxiliary window 21 of the lock screen setting mode, the controller 110 may change the auxiliary window 21 into the mini controller mode.

On the other hand, in the case that the change of the mode of the auxiliary window 21 is not requested in operation 209, the controller 110 may perform operation 213 so as to check whether a request for a performance of the function is made. If the request for the performance of the function is not made, the controller 110 may perform operation 217 described later. If the request for the performance of the function is made, on the other hand, the controller 110 may perform the requested function in operation 215. For example, the controller 110 may perform a function such as a reproduction of music, a stopping of music reproduction, pausing, a reproduction of a next song, a reproduction of a previous song and the like.

Figure 4A:
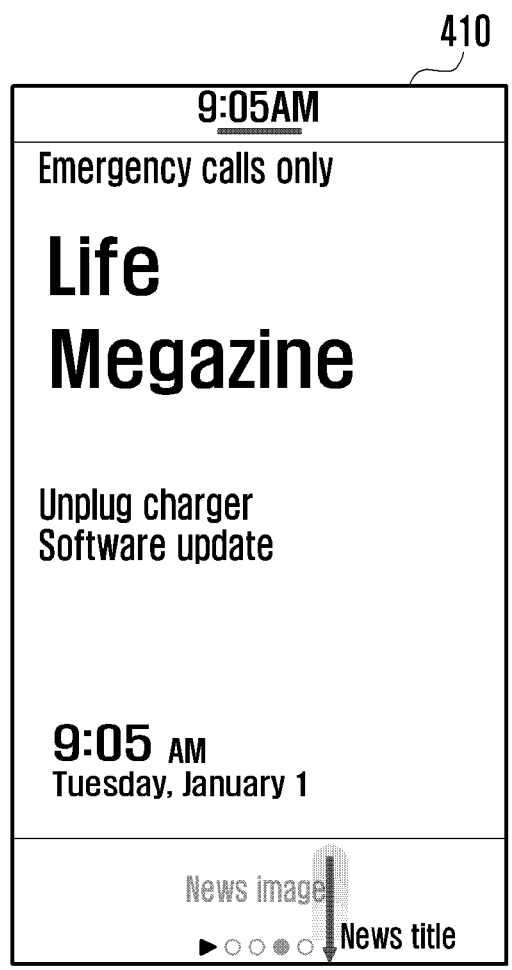
Figure 4B:
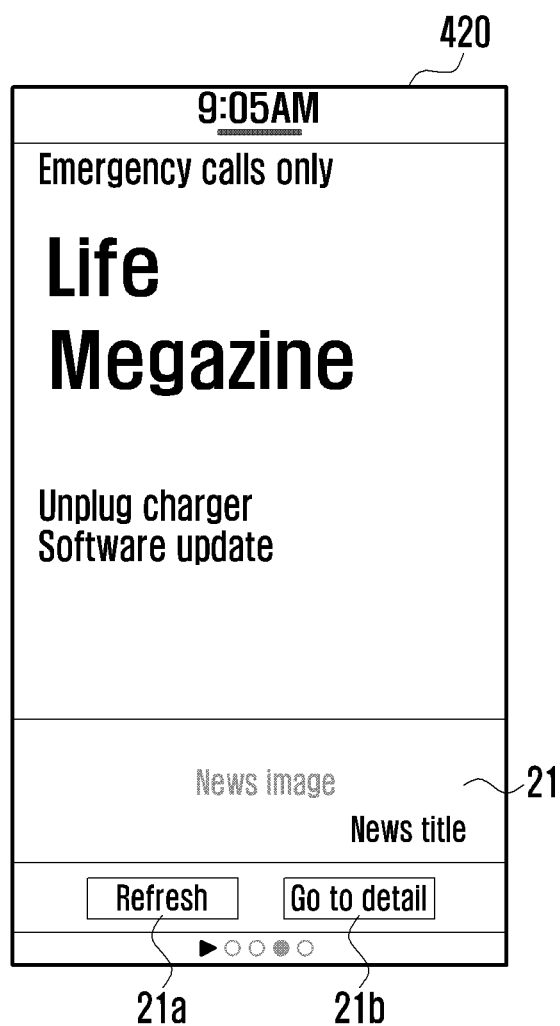

The controller 110 may refresh information, e.g., weather, news or the like, included in a widget at a predetermined time interval if the auxiliary window 21 is in a widget mode. Further, the controller 110 may refresh information, e.g., weather, news or the like, included in a widget if a vertical movement of the touch event is detected by the auxiliary window 21. That is, the controller 110 may refresh the screen of the auxiliary window 21. In the state that the auxiliary window 21 of providing news in the widget mode is displayed as indicated by a reference numeral 410 of FIG. 4A, if the vertical movement of the touch event is detected, the controller 110 may display a refresh menu 21a requesting an update of news and a detailed information menu 21b requesting a display of detailed information of a news widget on a lower portion of the auxiliary window 21, as shown in FIG. 4B. The menus 21a and 21b displayed in the exemplary view indicated by the reference numeral 420 in FIG. 4B are merely examples, and do not limit the exemplary embodiments.

If a request for releasing the lock is detected after an address icon is selected in the shortcut icon display mode, the controller 110 may control the display unit 131 to display an address screen at the same time when the lock is released. Further, the shortcut icons and the number of the shortcut icons which are displayed on the auxiliary window 21 may be changed by the user. According to exemplary embodiments, in the description of the process of changing the shortcut icon with reference to FIG. 5, the controller 110 may perform the lock screen setting mode in response to the request for the execution of the lock screen setting mode. The lock screen setting mode may be executed through a menu on the home screen. Alternatively, the lock screen setting mode may be executed when a preset touch event, e.g., long touch, or a pattern is input in the auxiliary window 21 of the lock screen 21. Also, the lock screen setting mode may be executed through a setting menu of the lock screen displayed on a side of the auxiliary window 21.

Figure 5:
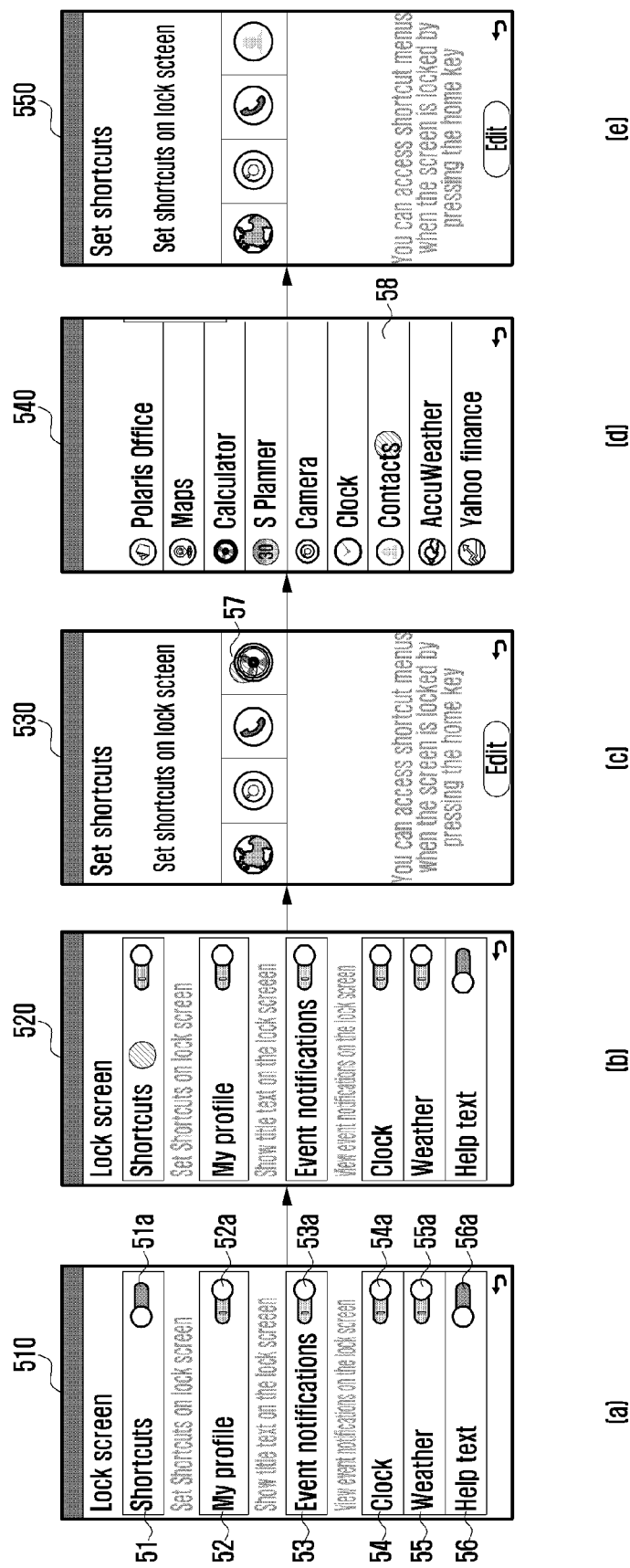

If a request for an execution of the lock screen setting mode is detected, the controller 110 may control the display unit 131 to display a setting screen of the lock screen (hereinafter, also referred to as the setting screen), as indicated by a reference numeral 510 in (a) of FIG. 5. The setting screen may include a shortcut icon setting menu 51, a profile setting menu 52, an event notification setting menu 53, a clock display setting menu 54, a weather display setting menu 55 and a help display setting menu 56. The menus 51, 52, 53, 54, 55 and 56 included in the lock screen may include on/off buttons 51a, 52a, 53a, 54a, 55a and 56a respectively. The user may control whether the lock screen of each menu is displayed through the on/off buttons 51a, 52a, 53a, 54a, 55a and 56a. It is understood, of course, that the setting screen shown in (a) of FIG. 5 is merely an example, and does not limit the exemplary embodiments. That is, the setting screen may further include other menus which can be set on the lock screen. For example, the setting screen may further include a news display setting menu, a mini controller display setting menu, a recent application display setting menu and the like.

Next, the user may turn on the on/off button 51a of the shortcut icon setting menu 51 in order to display the shortcut icon on the lock screen, as shown in the exemplary screen indicated by a reference numeral 520 in (b) of FIG. 5. Then, if the touch event is detected on the shortcut icon setting menu 51, the controller may display the shortcut icon setting screen including a predetermined number of icons, e.g., four icons, as shown in the exemplary screen indicated by a reference numeral 530 in (c) of FIG. 5. Then, in the state shown in the exemplary screen indicated by the reference numeral 530, if, for example, a music icon 57 is touched, the controller 110 may display a list of applications installed in the portable terminal 100 as shown in the exemplary screen indicated by a reference numeral 540 in (d) of FIG. 5. If an address icon 58 is selected from the list, the controller 110 may change the music icon 57 to the address icon 58 as shown in the exemplary screen indicated by a reference numeral 550 in (e) of FIG. 5. The user may set a shortcut icon displayed on the lock screen through the above-mentioned method. Although four shortcut icons are shown in FIG. 5, the exemplary embodiments are not limited thereto. That is, the number of the shortcut icons may be changed by the user.

If a request for a release of the lock is detected after a specific icon is selected in the mode for displaying an icon of a recently executed application, the controller 110 may perform a function corresponding to the selected icon while releasing the lock. That is, the recently executed application icon display mode is executed similarly to the shortcut icon display mode except that the predetermined number of applications recently executed are displayed. The number of recently executed icons displayed on the auxiliary window 21 may be changed by the user.

Figure 6:
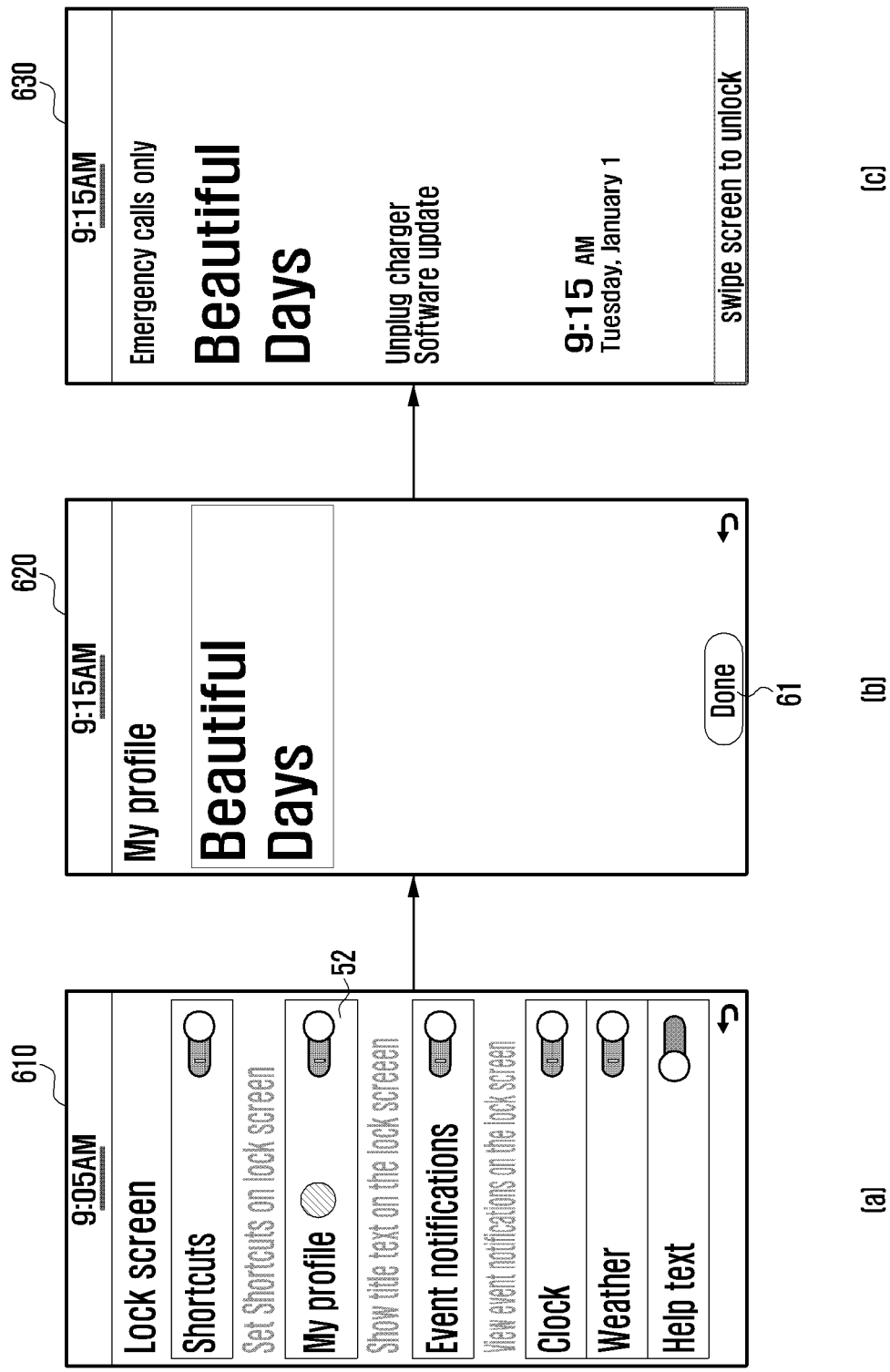

If a touch event is detected on the profile setting menu 52 in the setting screen as shown in the exemplary screen indicated by a reference numeral 610 in (a) of FIG. 6, the controller 110 may display a profile setting screen in which letters to be displayed on the lock screen may be input as shown in the exemplary screen indicated by a reference numeral 620 in (b) of FIG. 6. After the user freely inputs the letters in the profile setting screen, he/she can touch a completion menu 61 located at a lower portion of the profile setting screen. If the completion menu 61 is input, the controller 110 may display input letters such as, for example, "Beautiful Days" on the lock screen as shown in the exemplary screen indicated by a reference numeral 630 in (c) of FIG. 6.

Figure 7:
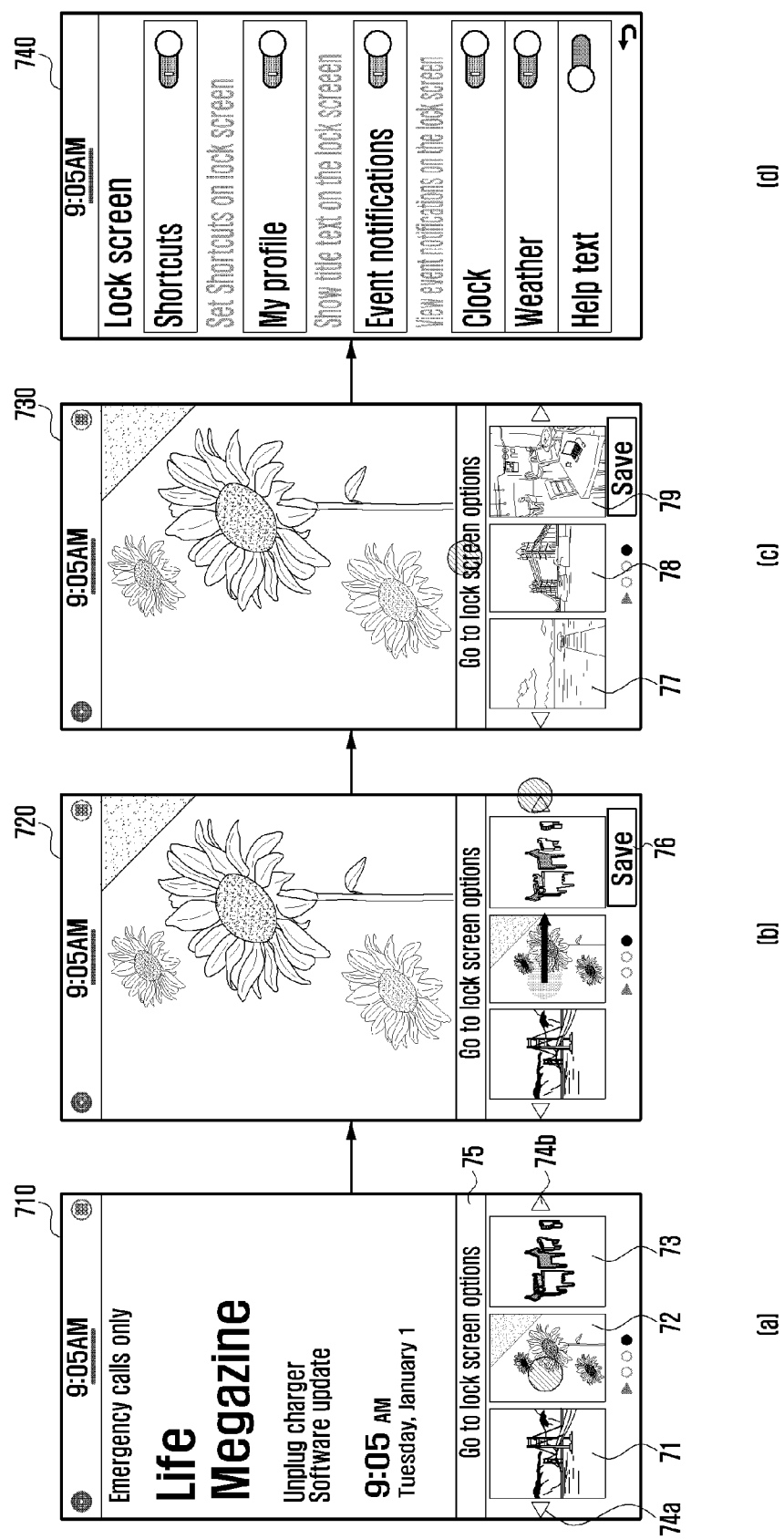

If a selection (touch) of a specific thumbnail image is detected in a background setting mode of the lock screen, the controller 110 may change a background image of the lock screen to a background image corresponding to the thumbnail image selected by the user. Hereinafter, the change of the background image in the lock screen will be described in more detail with reference to FIG. 7. Referring to FIG. 7, the auxiliary window 21 of the background setting mode of the lock screen may include a predetermined number of thumbnail images, e.g., first, second and third thumbnail images 71, 72 and 73, direction keys 74a and 74b indicating that more thumbnail images are present and enabling a user to request a change of the thumbnail image, and the lock screen setting menu 75, as shown in the exemplary screen indicated by reference numeral 710 in (a) of FIG. 7. When the selection (touch) of the specific thumbnail image is detected, the controller 110 may further display a storage menu 76 enabling a user to request a change of the background image of the lock screen on the auxiliary window 21 of the background setting mode of the lock screen as shown in the exemplary screen indicated by a reference numeral 720 in (b) of FIG. 7.

In the exemplary screen indicated by the reference numeral 720, if the storage menu 76 is input, the controller 110 may change the background image of the lock screen into a background image corresponding to the second thumbnail image 72. As described above, according to the exemplary embodiments, it is possible to change the background image of the lock screen in the lock screen state, thereby improving user's convenience. Also, when the touch on the thumbnail image is detected, the controller 110 according to another exemplary embodiment may control the display unit 131 to immediately change the background image of the lock screen.

In the state of the exemplary screen indicated by a reference numeral 720, if the right directional key 74b is touched, the controller 110 may change the thumbnail image as shown in the exemplary screen indicated by a reference numeral 730 in (c) of FIG. 7. That is, as shown in the exemplary screen indicated by the reference numeral 730, the controller may change the first, second and third thumbnail images 71, 72 and 73 into seventh, eighth and ninth thumbnail images 77, 78 and 79. Also, although the exemplary screen indicated by the reference numeral 730 shows that the thumbnail images are shown as a unit of a screen (including three thumbnail images), the exemplary embodiments are not limited thereto. For example, the controller 110 may show the thumbnail images one by one.

If the selection (touch) of the lock screen setting menu 75 is detected, the controller 110 may display the lock screen setting menu screen as shown in the exemplary screen indicated by a reference numeral 740 in (d) of FIG. 7. The description of the lock screen setting menu screen will be omitted because the lock screen setting menu screen has been already described with reference to FIGS. 5 and 6.

In the exemplary embodiment shown in FIG. 7, only a background image is changed by using the auxiliary window 21 of the background setting mode. However, according to another exemplary embodiment, positions of the structural elements of the lock screen, such as a text style of the lock screen, a profile displayed on the lock screen, an event 32 to be indicated to a user, a clock 33 and the like may be changed. That is, the exemplary embodiments may change at least one of the background image, the text style, and the positions of the structural elements of the lock screen by using the auxiliary window 21 of the background setting mode.

Next, the controller 110 can check whether a request for a display termination of the auxiliary window 21 is detected, in operation 217. If the request for the display termination of the auxiliary window 21 is not detected, the controller 110 may return to operation 209 so as to repeat the above-mentioned process. If the request for the display termination of the auxiliary window 21 is detected, the controller 110 may perform operation 219 so as to remove the auxiliary window 21.

In the exemplary embodiment shown in FIG. 3, the mode of the auxiliary window 21 is changed through a movement of a touch event in a first direction. However, the exemplary embodiments are not limited thereto. For example, according to another exemplary embodiment, the mode of the auxiliary window 21 may be changed through an input of the predetermined key, e.g., the home key. As described above, in the case that the mode of the auxiliary window 21 is changed through the input of the home key, the auxiliary window 21 may be turned on/off through a long key input such that the home key is input for longer than a predetermined time. Alternatively, according to another exemplary embodiment, a plurality of icons mapped on each mode is displayed on a side of the auxiliary window 21, and the mode of the auxiliary window 21 may be changed through the selection (touch) of each icon. Alternatively, the mode of the auxiliary window 21 may be changed through a separate touch event, e.g., a double touch, a long touch and the like, or a gesture event with a specific pattern for the change of the mode of the auxiliary window 21. A type of the separate touch event and a shape of the specific pattern for the change of the mode of the auxiliary window 21 may set by the user.

Further, although it is shown in FIGS. 3 to 7 that the auxiliary window 21 is displayed at a lower portion of the lock image display region 20, the auxiliary window 21 may be displayed at any position on the lock screen without limitation.

Further, in the case that the function executed in the auxiliary window 21 corresponds to a function requesting the release of the lock screen, the controller 110 checks whether a password, a pattern or the like for the release of the lock screen is set, and if the password, the pattern or the like is set, the controller 110 requires the user to input the password or the pattern. If the input password or the pattern is identical to the preset password or pattern, the controller may release the screen lock and perform the requested function.

Figure 8:
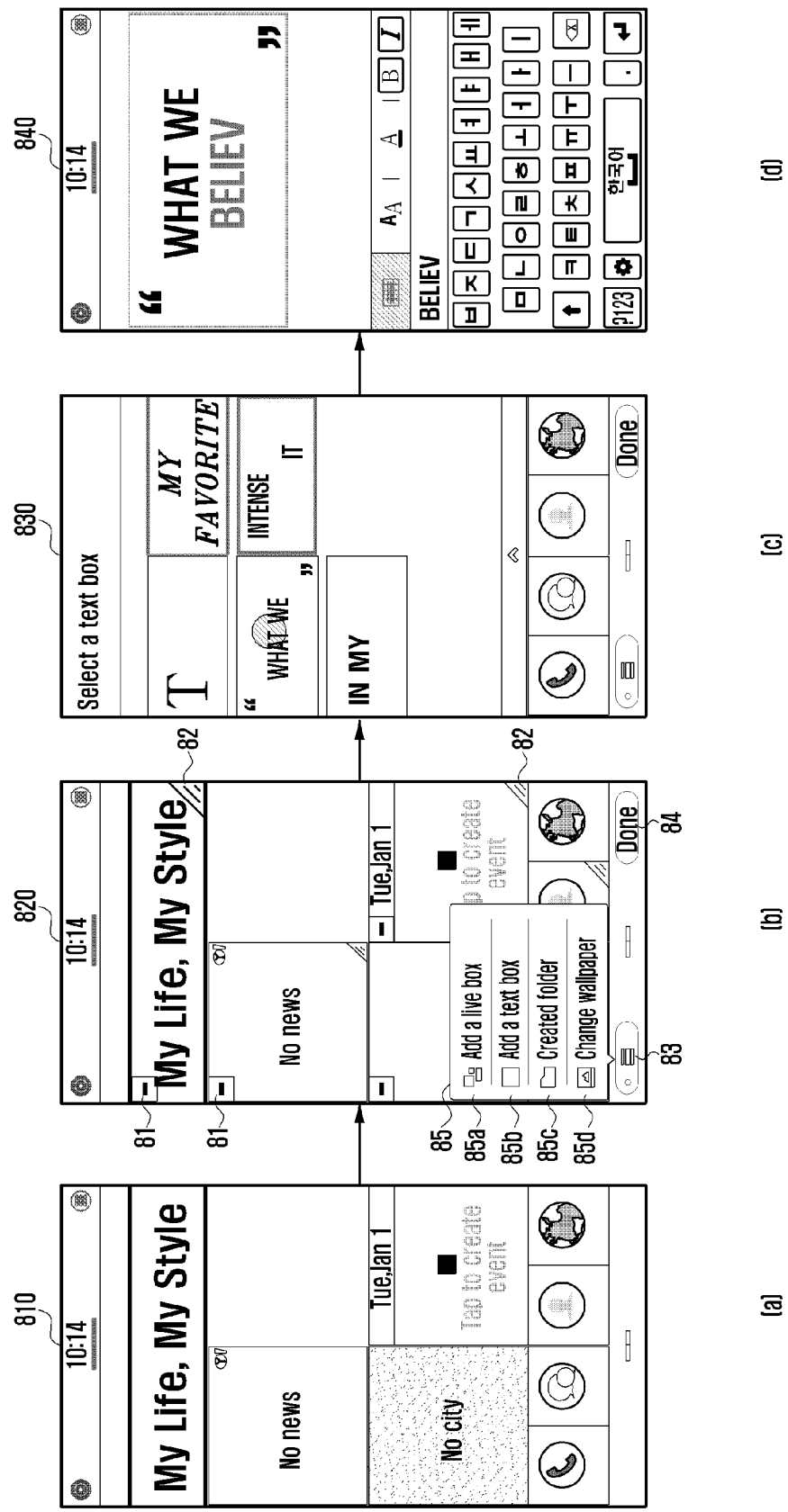
FIG. 8 is an exemplary view illustrating a home screen on which the UI is provided according to an exemplary embodiment.

FIG. 8 is an exemplary view illustrating a home screen on which the process of providing the UI is executed according to an exemplary embodiment.

Referring to FIG. 8, the controller 110 according to an exemplary embodiment may display the home screen such as the exemplary screen indicated by a reference numeral 810 in (a) of FIG. 8. The home screen may include a plurality of items, such as a live box, a text box, a folder and the like. The home screen may be formed in a metro type, although is not limited thereto.

If a request for editing the home screen is requested, the controller 110 enters an editing mode as shown in the exemplary screen indicated by a reference numeral 820 in (b) of FIG. 8. The editing mode may be executed through the preset touch event, e.g., a long touch, an input of pattern and the like, a menu and the like.

If the editing mode is executed, a removal icon 81 for removing an icon and a size changing icon 82 for adjusting a size of an icon are displayed at a side of the items included in the home screen. That is, the controller 110 may remove a corresponding item from the home screen when the removal icon 81 is touched, and change at least one of a landscape size and a portrait size of the corresponding item in correspondence to a movement of the touch in the state that the size changing icon 82 is touched. When the editing mode is executed, an addition menu 83 for adding an item and an editing termination menu 84 are displayed at a lower portion of the home screen. That is, if the addition menu 83 is selected (touched), the controller 110 may display a list 85 of items which may be added to the home menu such as the exemplary screen indicated by a reference numeral 820. The list 85 may include a live box addition menu 85a, a text box addition menu 85b, a folder creation menu 85c and a background image changing menu 85d. However, the exemplary embodiments are not limited thereto.

If the text box addition menu 85b is selected (touched) from the list 85, the controller 110 may control the display unit 131 to display a style setting screen for selecting a style of the text box, as shown in an exemplary screen indicated by a reference numeral 830 in (c) of FIG. 8. The style setting screen includes a plurality of style items. The style items may be differently set in terms of size, type, color and the like of a font.

If a specific style item 87 is selected (touched) from the style setting screen, the controller 110 may display a screen on which letters may be input as shown in an exemplary screen indicated by a reference numeral 840 in (d) of FIG. 8. When the input of the letters is completed, the controller 110 may add the text box, which includes the letters with a style, e.g., a size, type, color and the like of the font, set in the selected style item 87, to the home screen. The text box may include a plurality of letters, and the plurality of letters may be sequentially or randomly displayed on the screen at a predetermined period.

Figure 9:
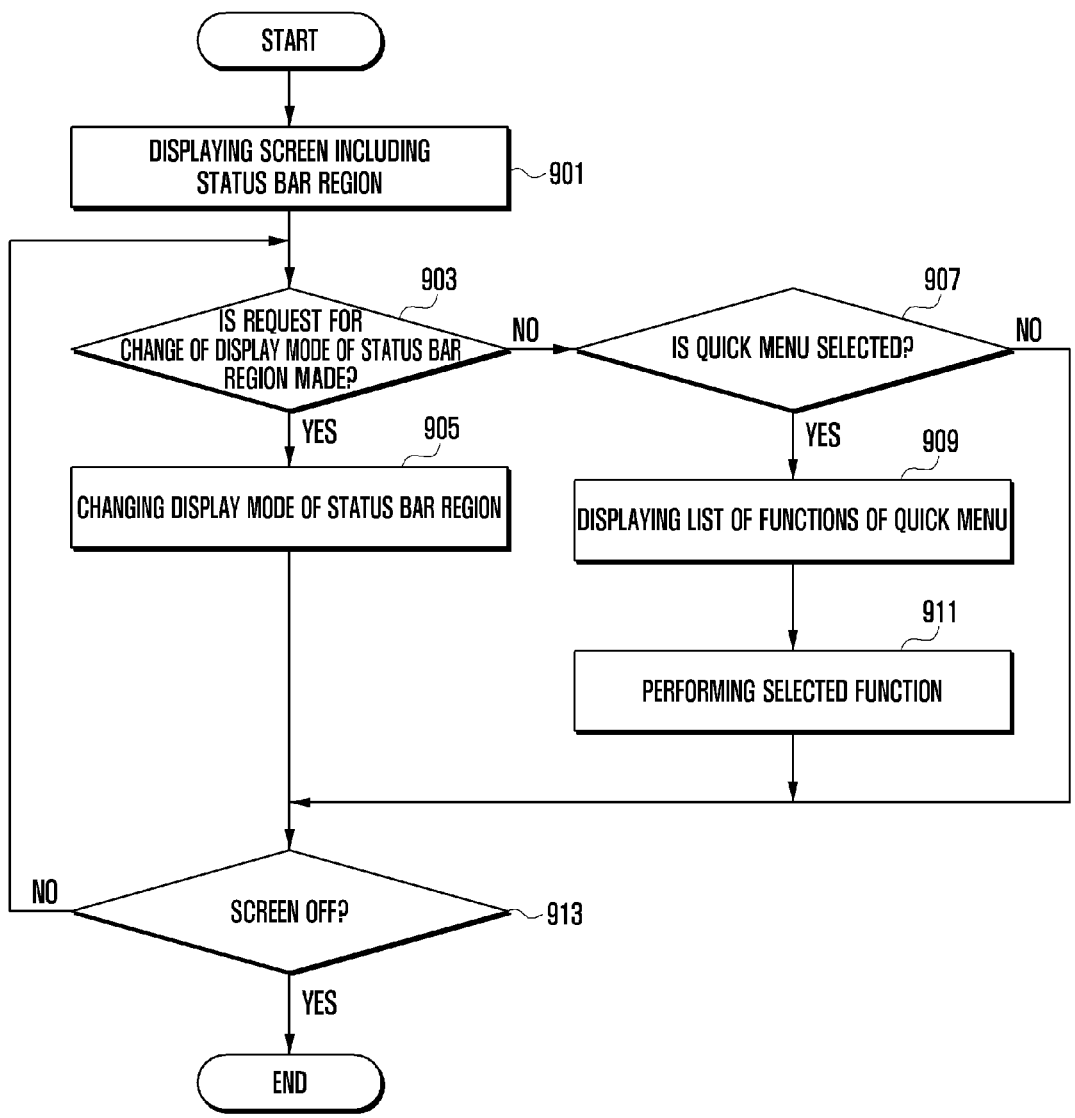
FIG. 9 is a flowchart illustrating a process of providing the UI on a status bar according to an exemplary embodiment.
Figure 10:
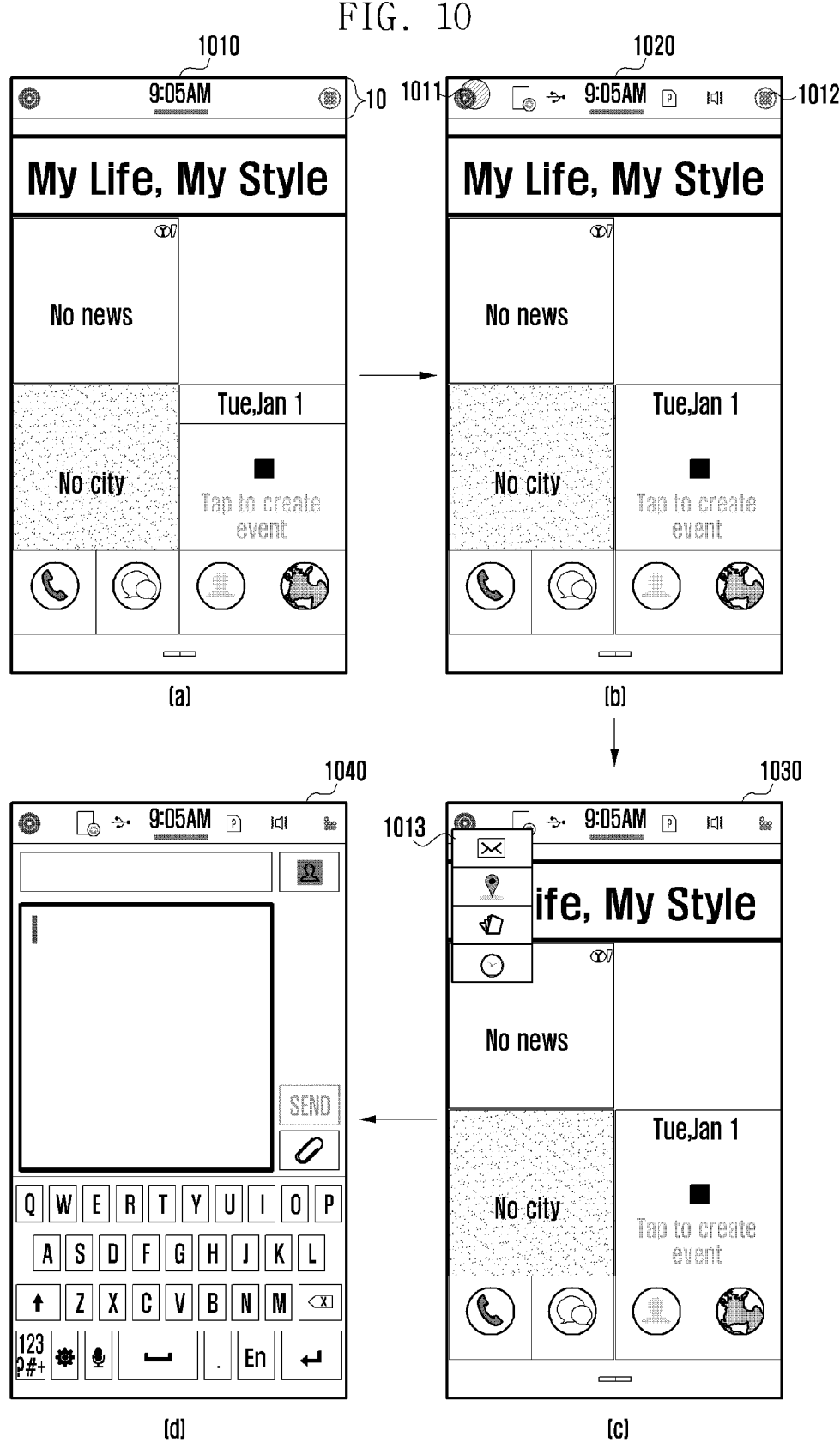
FIG. 10 is an exemplary view illustrating the status bar on which the UI is provided according to an exemplary embodiment.

FIG. 9 is a flowchart illustrating a process of providing the UI on the status bar according to an exemplary embodiment, and FIG. 10 is an exemplary view illustrating the status bar on which the UI is provided according to an exemplary embodiment.

Referring to FIGS. 9 and 10, the controller 110 according to an exemplary embodiment may display a screen including a status bar region 10 in operation 901. The screen including the status bar region 10 may be an operation screen of the portable terminal, such as the lock screen, the home screen and the like. The operation screen may be many different types of screens in the case that a whole screen such as a game and multimedia reproduction screen is not required. Hereinafter, the home screen will be described as an example.

Next, the controller 110 may check whether a request for a change of a display mode of the status bar region 10 is detected, in operation 903. The request for the change of the display mode may be detected in the form of a touch event of the status bar region 10. However, the exemplary embodiments are not limited thereto, and the request for the change of the display mode may be made through many different techniques, e.g., a long touch, a pattern input, a menu input and the like.

If the request for the change of the display mode is detected in operation 903, the controller 110 performs operation 905 so as to change the display mode of the status bar region 10. Particularly, as shown in exemplary screens indicated by reference numerals 1010 and 1020 in (a) and (b) of FIG. 10, respectively, the controller 110 may change the display mode of the status bar region 10. Particularly, the status bar region 10 according to an exemplary embodiment may be operated in a first display mode for notifying the user of all pieces of information provided by the system, and a second display mode for notifying the user of only information previously designated by the user. At this time, an exemplary screen indicated by the reference numeral 1010 is an example in which the status bar region 10 operates in the second display mode, and an exemplary screen indicated by the reference numeral 1020 is an example in which the status bar region 10 operates in the first display mode. According to exemplary embodiments, although the exemplary screen indicated by the reference numeral 1010 is set by the user to display only time in the second display mode, the second display mode may be a status in which there is no notification of other information except for the time information among various pieces of information previously designated by the user. The second display mode may be used in the case that a large number of icons are displayed in the status bar region 10 so that the user has difficulty in recognizing the status of the portable terminal at a glance.

In the case that the request for the change of the display mode is not detected in operation 903, the controller 110 performs operation 907 and may check whether a selection (e.g., touch) of one of the quick menus 1011 and 1012 located at a side of the status bar region 10 is detected. The quick menu may include a first quick menu 1011 for providing functions preset by the user and a second quick menu 1012 for providing all functions included in the portable terminal 100 or functions designated by a manufacturer. The first and second quick menus 1011 and 1012 may be formed in a slide type. The first and second quick menus 1011 and 1012 may always be displayed in the status bar region 10 regardless of the display mode of the status bar region 10, although are not limited thereto and may be displayed according to other criteria as well.

If the selection of the quick menus 1011 and 1012 is not detected, the controller 110 may perform operation 913 described later. On the other hand, if the selection (e.g., touch) of one of the quick menus 1011 and 1012 is detected, the controller 110 performs operation 909 so as to display a list of functions included in the touched quick menu, and may execute the function selected from the list in operation 911. For example, if the first quick menu 1011 is selected (e.g., touched) as shown in an exemplary screen indicated by a reference numeral 1020 in (b) of FIG. 10, the controller 110 may display a list 1013 of functions preset by the user as shown in an exemplary screen indicated by a reference numeral 1030 in (c) of FIG. 10. If, for example, a function of writing an SMS is selected from the list 1013, the controller 110 may control the display unit 131 to display a screen for writing the SMS as shown in an exemplary screen indicated by a reference numeral 1040 in (d) of FIG. 10.

The controller 110 may check whether a request for turning off a screen is detected in operation 913. If the request for turning off the screen is not detected, the controller 110 may return to operation 903 and repeat the above-mentioned processes.

Figure 11:
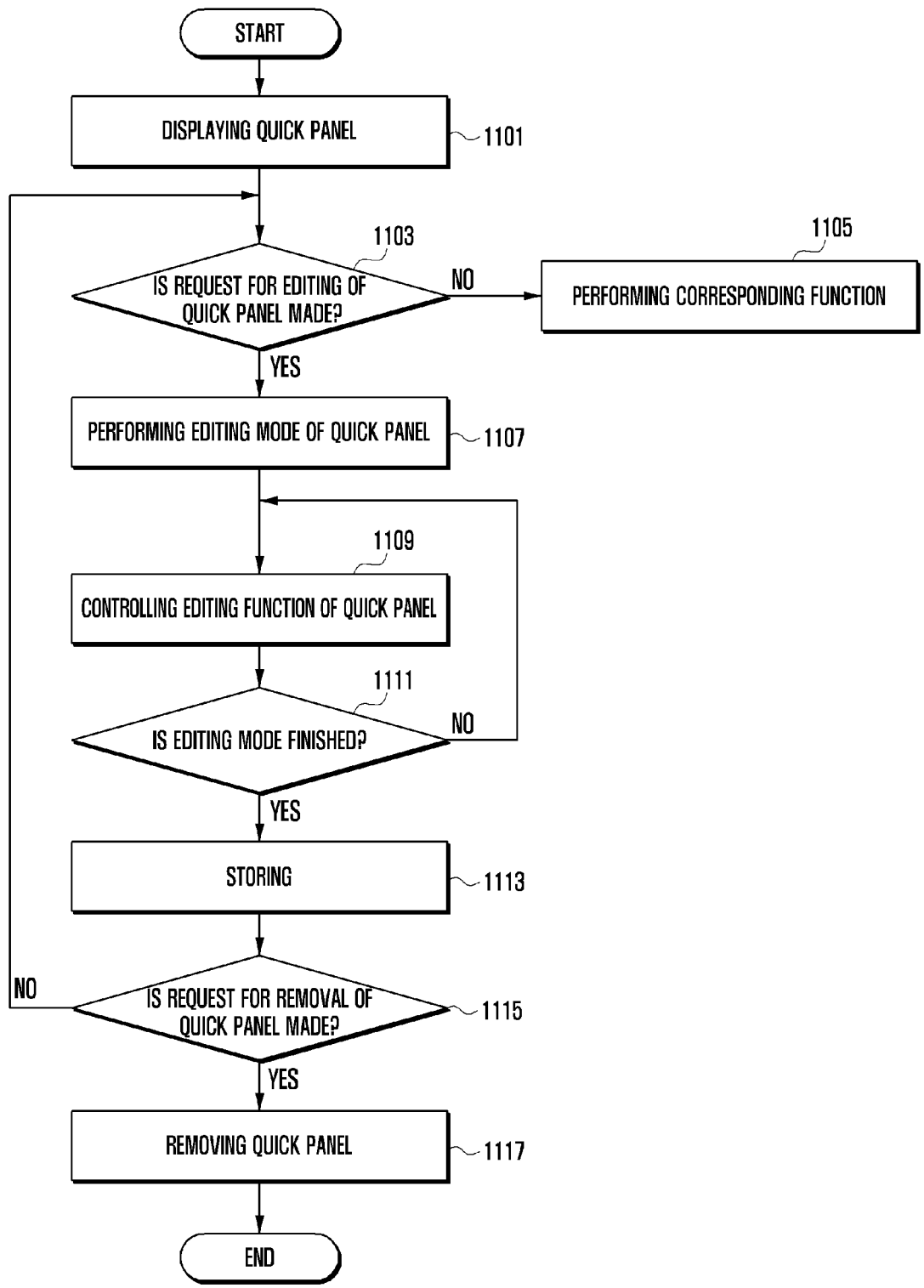
FIG. 11 is a flowchart illustrating a process of providing a User Interface (UI) on a quick panel according to an exemplary embodiment.

FIG. 11 is a flowchart illustrating a process of providing the UI on the quick panel according to an exemplary embodiment, and FIG. 12 is an exemplary view illustrating the UI on which the quick panel is provided according to an exemplary embodiment.

Referring to FIGS. 11 and 12, the controller 110 according to an exemplary embodiment may display the quick panel in operation 1101. The quick panel may be displayed, for example, when the status bar region 10 is moved in a direction towards a lower end of the screen with a touched state. The quick panel may include a function item display region 40 for displaying a plurality of function items 1211, 1212, 1213, 1214, 1215 and 1216 in order to quickly turn on/off a function provided by the portable terminal 100, and a notification information display region 50 for displaying information 1217 (hereinafter, also referred to as notification information) to notify the user of certain information, as shown in an exemplary screen indicated by a reference numeral 1210 in (a) of FIG. 12.

The controller 110 may check whether a request for an editing of the quick panel is detected in operation 1103. The request for the editing of the quick panel may be made through a long touch of the quick panel, an input of a specific pattern, a menu, and the like.

If the request of the editing of the quick panel is not detected in operation 1103, the controller 110 may perform a corresponding function in operation 1105. For example, if the touch on the functional item is detected, a function corresponding to the touched functional item may be controlled to be turned on/off. Further, the controller 110 may control the display unit 131 to display a screen in which the touched notification information can be identified when the touch on the notification information is detected. On the other hand, if the request for the editing of the quick panel is detected in operation 1103, the controller 110 performs operation 1107 so as to execute an editing mode of the quick panel.

If the editing mode of the quick panel is executed, the controller 110 may control the editing function of the quick panel in operation 1109. The editing function may include an addition, a deletion, or a location movement of the functional item. For example, as shown in an exemplary screen indicated by a reference numeral 1220 in (b) of FIG. 12, if a Bluetooth function item 1214 is touched, the controller 110 may display a removal icon 1214a for requesting a removal of the functional item and a setting icon 1214b for moving the functional item to the setting screen on a side of the functional item 1214. In the case that the Bluetooth icon 1214 is moved in a touched state, the controller 110 may move the Bluetooth function item 1214 in the touched state, and then release the Bluetooth icon 1214 at a position where the touch on the Bluetooth function item is released, as shown in an exemplary screen indicated by a reference numeral 1230 in (c) of FIG. 12. At this time, the controller 110 moves other functional items 1211, 1212 and 1213 to the right.

The controller 110 may check whether a request for a termination of the editing mode is detected in operation 1111. If the termination of the editing mode is not detected, the controller 110 may return to operation 109. On the other hand, if the termination of the editing mode is detected, the controller 110 performs operation 1113 so as to store a layout of the edited quick panel.

The controller 110 may check whether a request for a removal of the quick panel is detected in operation 1115. The request for the removal of the quick panel may occur when a lower end of the quick panel is moved in an upward direction in a touched state, or a cancel key, a home key or the like is input. If a request for the removal of the quick panel is not detected, the controller 110 may return to operation 1103. On the other hand, if the request for the removal of the quick panel is detected, the controller 110 performs operation 1117 so as to remove the quick panel.

The method of providing the UI of the portable terminal according to the exemplary embodiments as described above may be implemented in the form of a program instruction which may be executed through various computing devices, and stored in a computer readable storage medium. The computer-readable recording medium may include a program command, a data file, a data structure, or a combination thereof. According to exemplary embodiments, the program command recorded in the recording medium is specially designed and configured for the exemplary embodiments, but may also be known to those skilled in computer software fields. The computer-readable recording medium includes magnetic media such as hard disks, floppy disks and magnetic tapes, optical media such as a Compact Disc Read-Only Memory (CD-ROM) and a Digital Versatile Disc (DVD), magneto-optical media such as floptical disks, and hardware devices such as a Read-Only Memory (ROM), a Random Access Memory (RAM) and a flash memory, which are specially configured to store and perform program commands. Further, the program command includes a machine language code generated by a compiler and a high-level language code executable by a computer through an interpreter and the like. The hardware devices may be configured to operate as one or more software modules to perform the operations of the exemplary embodiments.

Although the method and the apparatus for managing the audio data and image data of the electronic device according to the exemplary embodiments have been described through the specification and drawings by using specific terms, the terms used to describe the exemplary embodiments are not limiting, and are merely used as general meanings to easily describe technical contents of the exemplary embodiments and assist in the understanding of the exemplary embodiments, and the present invention is not limited to the exemplary embodiments described herein. That is, it is apparent to those skilled in the art that various other exemplary embodiments based on the technical idea of the present disclosure can be implemented.

Exemplary embodiments shown and described in this specification and the drawings correspond to specific examples presented in order to easily explain technical contents of the exemplary embodiments, and to help comprehension of the exemplary embodiments, but are not intended to limit the scope of the present invention. It is obvious to those skilled in the art to which the exemplary embodiments pertain that the exemplary embodiments described herein can be modified and still fall within the spirit and scope of the present invention.

What is claimed is:

1. A method of controlling a mobile device, the method comprising:
   displaying a screen of the mobile device, the screen comprising a status bar region; and
   in response to detecting a first touch event in the status bar region, changing a display mode of the status bar region,
   wherein the display mode of the status bar region includes a first display mode for displaying all notification icons for all pieces of notification information, and a second display mode for displaying a single notification icon, among the notification icons, for one of the pieces of the notification information selected by a user.

2. The method according to claim 1, wherein:
   the screen of the mobile device comprises at least one of a lock screen, a home screen, and an operation screen.

3. The method according to claim 2, further comprising:
   detecting a second touch event in the status bar region; and
   in response to detecting the second touch event, outputting a quick menu, the quick menu including at least one of a first quick menu configured to selectively execute a function preset by the user, and a second quick menu configured to selectively execute a function provided by the portable terminal.

4. The method according to claim 1, further comprising:
   outputting a quick panel including at least one functional icon for activating or deactivating a function provided by the portable terminal in response to the status bar region being moved in a direction of a lower portion of the screen in a touched state, and outputting one of the pieces of the notification information;
   activating an editing mode of the quick panel in response to detecting a request for an editing mode of the quick panel;
   editing a layout of the quick panel by performing at least one of an addition, a deletion, or a location movement of the at least one functional icon; and
   storing the edited layout when the editing mode is completed.

5. An apparatus configured to control a mobile device, the apparatus comprising:

a touch detector configured to detect a touch on a screen of the mobile device;

a display configured to display the screen such that the screen comprises a status bar region; and a controller configured to change a display mode of the status bar region in response to detecting a first touch event in the status bar region, wherein the display mode of the status bar region includes a first display mode for displaying all notification icons for all pieces of notification information, and a second display mode for displaying only a single notification icon, among the notification icons, for one of the pieces of the notification information selected by a user.

6. A non-transitory computer readable recording medium storing instructions which, when executed, control a mobile device to perform a method comprising:

displaying a screen of the mobile device, the screen comprising a status bar region; and in response to detecting a first touch event in the status bar region, changing a display mode of the status bar region, wherein the display mode of the status bar region includes a first display mode for displaying all notification icons for all pieces of notification information, and a second display mode for displaying only a single notification icon, among the notification icons, for one of the pieces of the notification information selected by a user.

\* \* \* \* \*